Sept. 3, 1968  N. L. BROWN  3,399,566
FLOW METER
Filed Oct. 15, 1964  2 Sheets-Sheet 1
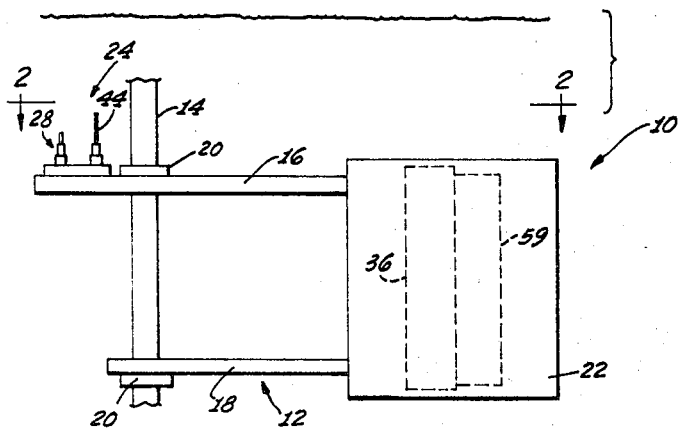
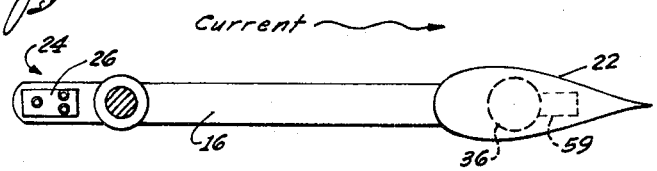
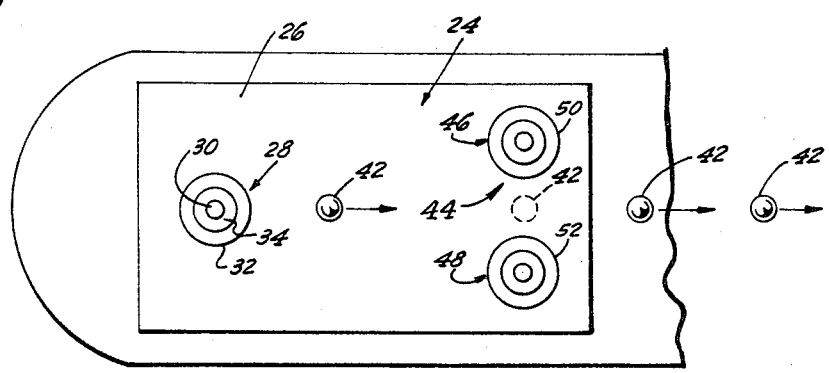
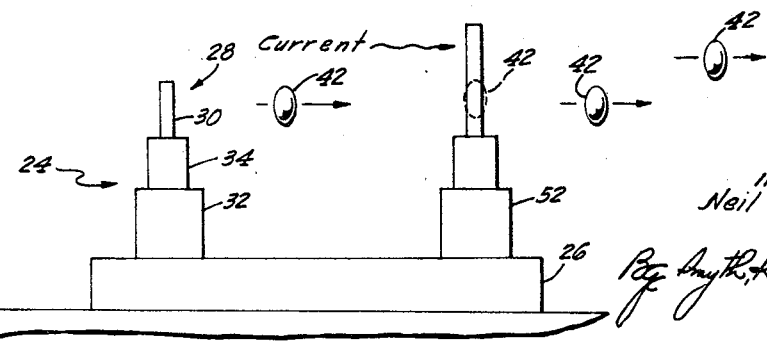
INVENTOR:
Neil L. Brown
Attorneys

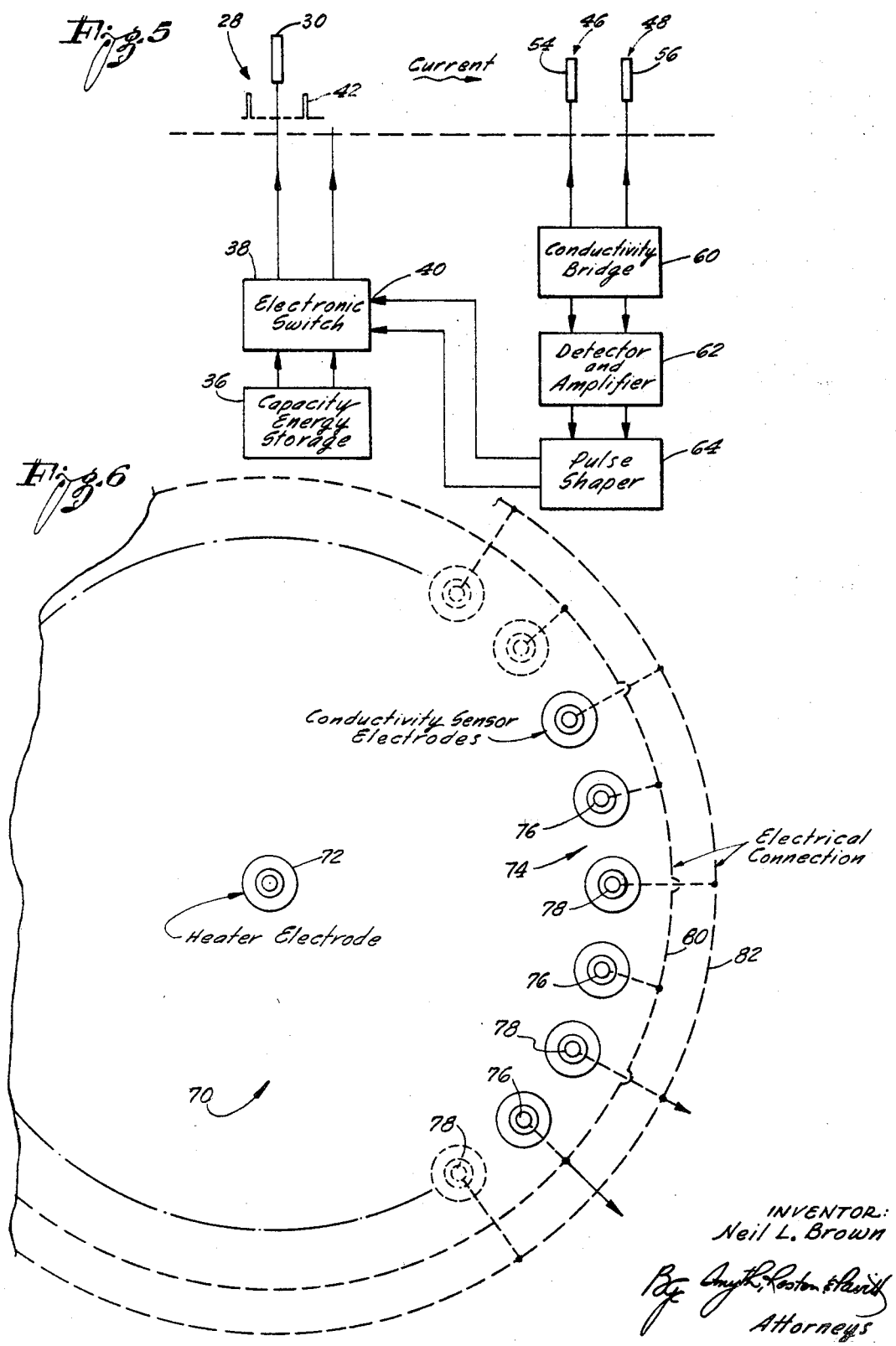

United States Patent Office 3,399,566
Patented Sept. 3, 1968

3,399,566
FLOW METER
Neil L. Brown, El Cajon, Calif., assignor to The Bissett-Berman Corporation, Santa Monica, Calif., a corporation of California
Filed Oct. 15, 1964, Ser. No. 404,025
6 Claims. (Cl. 73—204)

The present invention relates to flow meters and more particularly to flow meters for measuring the rate of flow or velocity of a moving liquid such as the sea water in an ocean current.

The most common form of flow meter used for measuring the velocity of an ocean current employs a mechanical impeller such as a propeller that is immersed in the moving water. The speed of rotation of the impeller is a function of the rate at which water is moving therepast and, as a consequence, can be used to indicate the velocity of the current. Unfortunately, instruments of this type have several disadvantages. The rotating parts have a large amount of inertia and a slow response. This limits the ability of the instrument to measure rapid variations in current velocity. In addition, factors such as bearing friction, wear and marine fouling impair the accuracy of measurements. Moreover, impeller-type instruments capable of measuring very slow currents are inherently fragile and, therefore, difficult to use and subject to premature failure.

Another form of flow meter which has been used for measuring the velocity of an ocean current transmits acoustical energy over a known distance and measures the transit time. If the rate of propagation is accurately known, the rate at which the water is moving can be accurately determined. However, when operating under the conditions normally encountered in an ocean current, the velocity of propagation varies over a considerable range. As a consequence, it is very difficult, if not impossible, to make a useful determination of the velocity of an ocean current with a simple acoustical instrument. To compensate for variations in the rate of propagation, it has been proposed to use a complex acoustical instrument wherein the acoustical energy is transmitted over two separate paths. This tends to greatly reduce the amount of error and increase the accuracy of the velocity measurements into an acceptable range for some types of applications. However, such instruments are not only very complicated and expensive, but are also subject to very serious operating difficulties. Moreover, acoustical instruments are normally quite sensitive to marine fouling and cannot be left immersed in sea water for extended periods of time. As a result, acoustical flow meters have not been employed to any great extent.

Another type of flow meters for measuring the velocity of an ocean current employs a device such as a Pitot tube or a Venturi tube. Means are provided to sense the difference between the static pressure of the sea water and a dynamic pressure produced by the water moving through the device and to indicate the velocity of the water. The accuracy of such an instrument is inherently poor, particularly at the relatively low velocities at which ocean currents flow. As a consequence, the use of Pitot tubes and Venturi types of instruments have been limited to the measurement of relatively high velocities. Also, they are sensitive to marine fouling and cannot be left submerged for extended periods of time.

It has also been proposed to put a tracer in the water and to observe the period of time for the tracer to move over a predetermined distance. One form of tracer is a visible dye that can be manually observed and timed. This form of tracer is obviously not suitable for making continuous velocity measurements and cannot be used at great depths. Another form of tracer employs a radioactive material. Although a tracer of this type can be sensed by an instrument, it possesses certain hazards. When employing either form of tracer, it is very difficult, if not impossible, to store an adequate supply of dye or radioactive material at the location of the instrument to permit unattended operation for an extended period of time. It is also necessary to physically eject the tracer into the sea water. It is very difficult and expensive to design and build an ejection mechanism that will operate effectively particularly for extended periods of time when subjected to severe marine fouling.

More recently, it has been proposed to produce a thermal tracer by heating a volume of water above the ambient temperature of the surrounding sea water. A temperature sensor such as a thermometer senses the passage of the heated water whereby the transit time of the heated water over a predetermined distance can be measured. Unfortunately, thermometers have a very slow response time and it is, therefore, necessary for the heated water to have a large volume to insure an adequate time for the sensor to respond. This necessitates a long transit time and an extended travel distance particularly at the high velocities. This, in turn, results in the heated water dispersing and becoming poorly defined prior to the time it reaches the thermometer. Thus, the accuracy, effectiveness, response time, etc. of such a device has been very poor.

The present invention provides a flow meter for measuring ocean current that overcomes the foregoing difficulties. More particularly, the present invention provides means for measuring an ocean current which is not only simple and inexpensive, but is also reliable and accurate and can be used for extended periods of time over a wide range of operating conditions. More particularly, means are provided for producing a very small parcel of heated water and to time the passage of this heated parcel over a distance that is so short that the parcel cannot disperse and the velocity of the ocean current and any fluctuations therein may be very accurately measured.

In one operative embodiment of the present invention, this is accomplished by providing a flow meter having a swinging vane that may be immersed in the ocean so as to line itself up with the flow of water. A small heater on the upstream portion of the vane is momentarily energized to heat a small parcel of water that is carried by the moving sea water. A pair of pickup probes are provided on the vane downstream from the heater whereby the parcel of heated water will pass therebetween. Although the two probes are spacially separated from each other, they are electrically interconnected by the conductivity of the sea water. Since the conductivity of the parcel of heated sea water differs materially from that of the cooler sea water, when the heated parcel passes between the two probes, the conductivity between the two probes will change. By measuring this change in the conductivity between the probes, the time for the heated parcel to travel from the heater to pickup probes may be determined and the velocity of the current computed.

These and other features and advantages of the present invention will become readily apparent from the following detailed description of the present invention particularly when taken in connection with the accompanying drawings wherein like reference numerals refer to like parts and wherein:

FIGURE 1 is a side view of the flow meter embodying one form of the present invention;

FIGURE 2 is a top view of the flow meter of FIGURE 1;

FIGURE 3 is a plan view on a greatly enlarged scale of a portion of the flow meter in FIGURE 2;

FIGURE 4 is a side view of the portion of the meter shown in FIGURE 3;

FIGURE 5 is a block diagram of an electronic portion of the flow meter, and

FIGURE 6 is a plan view of a portion of a flow meter embodying a modification of the present invention.

Referring to the drawings in more detail, the present invention is particularly adapted to be embodied in means such as a flow meter 10 for measuring the velocity at which the sea water in an ocean current is flowing past a particular location. The flow meter 10 includes a pickup unit 12 that may be temporarily or permanently disposed at any desired location for sensing the velocity at which the sea water is moving therepast. In the present instance, the pickup unit 12 is shown as being mounted on a vertical cable 14 which may be lowered into the ocean from a ship to retain the pickup unit 12 located at the site where the ocean current is to be measured.

The pickup unit 12 includes a frame having an upper arm 16 and a lower arm 18 which are disposed substantially parallel to each other. These arms 16 and 18 are adapted to be pivotally attached to the cable 14 so that the pickup unit 12 can rotate freely about the cable 14. A pair of stops 20 are attached to the cable 14 to limit the vertical movement of the pickup unit 12 along the cable 14.

A vane 22 is connected to the downstream ends of the two arms 16 and 18. The vane 22 reacts with the moving water and aligns itself and the two arms 16 and 18 with the direction the ocean current is flowing. It may be thus be seen that the arms 16 and 18 will always be aligned parallel to the direction of the movement.

A sensor 24 is mounted on the pickup unit 12 so as to be immersed in the sea water and be exposed to the ocean current. It has been found desirable for the sensor 24 to be mounted on a forward extension of one of the arms 16 or 18. This will place the sensor 24 upstream from the cable 14 in a region of undisturbed flow. As a result, the movement of the sea water past the sensor 24 will be as close as possible to its natural state at the time its velocity is measured.

The sensor 24 includes a mounting block 26 that is attached directly to the arm 16. Means are provided on the upstream end of the mounting block 26 for "tagging" the sea water so that it may be measured. Although this "tag" may be of any desired variety, it has been found desirable to employ means that will change the electrical conductivity of a small volume or a parcel of water from the ambient conductivity of the surrounding sea water.

As is well known, the conductivity of sea water varies over a considerable range and is dependent upon a large number of factors. One of the important factors controlling conductivity is the temperature of the water. For example, when the temperature varies over a range of about 0° C. to about 30° C., the conductivity of sea water will change by about 100% and the conductivity will vary on the order of about 2 or 3% for each change of one degree centigrade.

Accordingly, the sea water may be "tagged" by changing its electrical conductivity as a result of changing its temperature. In the present instance, this is accomplished by a heater 28 that is disposed on the upstream end of the mounting block 26. The heater 28 may be of any desired variety such as a section of platinum wire disposed in heat exchanging relation with the sea water. However, in the present instance, a coaxial heater 28 is employed.

The heater 28 includes a center electrode 30 and a cylindrical outer electrode 32 that is disposed concentrically around the inner electrode 30. The two electrodes 30 and 32 are separated from each other by a concentric sleeve 34 of insulating material. The inner electrode 30 projects beyond the end of the insulation 34 and the end of outer electrode 32.

The exterior surface of the electrode 30 is disposed in contact with the sea water so that an electrical current may flow therebetween. The exterior of the outer electrode 32 is also in electrical contact with the sea water. As a result, even though the surfaces of the two electrodes 30 and 32 are physically separated from each other by a substantial distance, they are electrically interconnected with each other by means of the electrical conductivity of the intervening sea water.

The two electrodes 30 and 32 in the heater 28 may be connected to any suitable means for causing an electrical current to flow from one electrode through the sea water to the other electrode. This means may include an electrical circuit which extends along the cable 14 to a power supply located in a ship on the surface of the ocean. Alternatively, as in the present instance, a power supply 36 may be provided in the vane 22 for supplying the required energy. This power supply 36 may be a battery or similar device.

The power supply 36 may be connected to the two electrodes 30 and 32 by any means capable by controlling the flow of electrical current to the electrodes 30 and 32. Since it is desirable to turn the heater 28 ON and OFF a large number of times at relatively high speeds, it has been found advantageous to employ an electronic switch 38 of the type containing diodes, transistors, etc. Such devices may be biased conductive or non-conductive in response to control signals on the control inputs 40 whereby the switch 38 will be opened or closed.

When the switch 38 is opened, the power supply 36 will be disconnected from the heater 28 and no potential will be applied to either of the electrodes 30 or 32. However, when the switch 38 is closed, the power supply 36 will be connected to the heater 28 and a potential difference will be maintained between the two electrodes 30 and 32. Whenever this potential difference exists, an electrical current will flow from one electrode surface through the sea water to the other electrode surface.

Since the center electrode 30 has a relatively small area, the current density in the sea water immediately adjacent to the center electrode 30 will be relatively high. This higher density electrical current flowing through the resistance of this sea water will be effective to generate heat. The amount of heat that is generated will, of course, be dependent upon the resistance of the sea water, the magnitude of the electrical current and the duration of the current.

The heat produced by the current will be transferred directly into the sea water and thereby raise the temperature of the water around the heater 28 and particularly adjacent the center electrode 30. For reasons that will become apparent subsequently, the magnitude of the current is sufficiently large and its duration sufficiently short to produce a well-defined parcel 42 of water that is relatively small, but is heated to a sufficient level above the surrounding sea water to have a conductivity that is materially different from the ambient conductivity of the surrounding sea water. As this parcel 42 is formed, it will be swept away from the heater 28 by the moving sea water and carried along by the ocean current. Since the vane 22 maintains the pickup unit 12 aligned with the ocean current, the parcel 42 of heated water will travel along a line parallel to the arm 16.

A pickup sensor 44 is provided on the mounting block 26 downstream from the heater 28 for detecting the passage of the parcel 42 of heated water. The pickup sensor 44 may be of any desired variety. However, since the temperature of the water in the parcel 42 is above the ambient temperature of the surrounding sea water, the conductivity of the parcel 42 will differ considerably from the conductivity of the surrounding sea water. Accordingly, the present pickup sensor 44 is effective to sense any changes in the conductivity of the water.

The pickup sensor 44 includes a pair of probes 46 and 48 that are disposed downstream from the heater 28 in line with the travel of the parcel 42. The probes 46 and 48 are preferably symmetrically disposed about the line of travel of the parcels 42 and are separated from each other by a sufficient distance to allow the parcels 42 to pass therebetween.

The two probes 46 and 48 are preferably substantially identical. Each of the probes 46 and 48 respectively includes an individual one of a pair of outer supports 50 and 52 which are secured to the downstream end of the mounting block 26. An individual one of a pair of electrically conductive inner members 54 and 56 projects upwardly above each of the supports 50 and 52. The outer surfaces of these members 54 and 56 are in intimate electrical contact with the sea water.

An electrical current may flow between the inner members 54 and 56 so that the sea water between the two members 54 and 56 will form an electrically conductive path that electrically interconnects the probes 46 and 48 with each other. As is well known, the electrical conductivity of sea water is a function of many factors such as the temperature thereof. In fact, as the temperature varies from about 0° C. to about 30° C., the conductivity will double. In the range of temperatures at which the present meter will normally be operating, the conductivity of the sea water will change on the order of between 2 and 3% for each change of 1° C. It will thus be seen that the amount of electrical conductivity between the two probes 46 and 48 will be a function of the temperature of the sea water therebetween.

As previously stated, the electrically conductive surfaces of the members 54 and 56 are substantially symmetrically disposed about a line parallel to the water current and extending through the heater 28. As a result, the parcels 42 of heated water will travel along this line and between the two electrode members 54 and 56. As a parcel 42 of heated water passes between the two electrode members 54 and 56, the temperature of the sea water therebetween will momentarily change and, therefore, the amount of conductivity will also change.

In order to sense the passage of the heated parcels 42 between the electrode members 54 and 56, they may be interconnected with any means capable of sensing changes in the conductivity between the two electrodes 54 and 56. In the present instance, this means is contained in a capsule 59 disposed in the vane 22 and includes a bridge 60 such as a conventional Wheatstone bridge. One side of the bridge 60 is formed by the electrical conductivity between the two electrodes 54 and 56. The bridge 60 is normally constructed and arranged so as to be substantially balanced when the temperature between the two electrode members 54 and 56 is equal to the surrounding ambient temperature. However, as the temperature of the sea water between the two probes 46 and 48 varies from this ambient temperature, the amount of conductivity between the two electrode members 54 and 56 will change sufficiently to unbalance the bridge.

Means may be interconnected with the bridge 60 so as to sense any unbalance which may occur in the bridge. Preferably, this means has a fast response to any momentary unbalance. Since such means provide a relatively sensitive response, the parcels of water being sensed can be relatively small and a response to changes in temperature of the water can still be obtained.

In the present instance, this means includes a combination detector-amplifier 62 connected directly to the bridge 60. Any unbalance will be immediately detected whereby a pulse corresponding thereto will be produced. The detector-amplifier 62 will then amplify the pulse to a more useful level.

The detector-amplifier 62 may be interconnected with the electronic switch 38 so as to actuate the switch 38 in response to the occurrence of a pulse. In the present instance, this interconnection is accomplished by means of a pulse shaper 64 which is effective to form a pulse of a substantially constant amplitude and of a predetermined duration. The pulse shaper 64 may be a conventional free running multivibrator that will periodically produce a constant amplitude pulse at some predetermined interval. The shaped pulse is supplied to the inputs 40 of the electronic switch 38 so as to momentarily close the switch 38 for a predetermined time interval.

When the switch closes, the power supply 36 is connected to the two electrodes 40 and 42 so as to maintain a potential difference between the surfaces. This potential difference will produce an electric current through the sea water and heat the water to form a parcel 42 of heated water. The parcel 42 will be carried by the moving sea water at a velocity equal to that of the ocean current toward and between the two pickup probes 46 and 48. When the parcel 42 passes between the probes 46 and 48, the conductivity between the electrodes 54 and 56 will change. The bridge 60 will then close the switch 38. It may be appreciated that the frequency at which the pulses are generated in the heater probe will be a function of the velocity of the sea water.

In order to use the flow meter, the pickup unit 12 may be mounted on the cable 14 and lowered to the location where the ocean current is to be measured. The vane 22 will immediately react with the moving water and align the arms 16 and 18 parallel to the direction of the current with the sensor 24 disposed upstream from the cable 14.

The pulse shaper 64 will eventually produce a trigger pulse and supply the pulse to the inputs 40 of the electronic switch 38. The electronic switch will then momentarily connect the power supply 36 with the heater 28 and provide a potential difference between the two probes 46 and 48. This potential difference will cause an electrical current to flow between the inner electrodes 54 and 56 and outer electrodes 50 and 52 and through the sea water. Since the exposed area of each of the inner electrodes 50 and 52 is small, the current will be concentrated in the portion of the water immediately adjacent to the inner electrodes 50 and 52. This high density current flowing through the electrical resistance of the sea water will produce a parcel of heated water around the heater 28 and particularly immediately adjacent to the inner electrodes 50 and 52.

The intensity of the current is preferably large enough to produce a substantial rise in the temperature of the water, for example, the sea water temperature within the parcel 42 may be on the order of 10 to 15° C. or more above the ambient temperature of the surrounding sea water. The duration of the electric current is preferably sufficiently short to insure the parcel 42 of heated water being relatively small and very well defined with a size and shape similar to that of the center electrode. By way of example, it has been found that the pulse may have a duration on the order of about 0.3 millisecond and about 0.01 joule may be transferred into the parcel 42.

As the ocean current moves the sea water past the heater 28, the parcel 42 of heated sea water will travel along a predetermined line of travel which passes between the two pickup probes 46 and 48. Normally, the conductivity of the sea water between the pickup probes 46 and 48 will be such that the conductivity bridge 60 will be balanced and no signals will be transferred to the pulse shaper 64.

After the heated parcel 42 has been carried over the distance from the heater 28 to the pickup probes 46 and 48, the conductivity between the two electrode members 54 and 56 will momentarily change. This change will unbalance the bridge 60 and trigger the pulse shaper 64. The pulse shaper 64 normally is a free running multivibrator that can be triggered by a signal on the input. The period of the shaper 64 may be longer than the transit time of a parcel 42 travelling at the slowest velocity to be measured. This will not interfere with the operation of the flow meter 10, but it will insure the meter being self-starting.

The pulse shaper 64 will be effective to produce a pulse train wherein each pulse has a predetermined time duration such as 0.3 millisecond and closes the switch 38 for a corresponding time interval. A new parcel of heated water will be formed at the heater 28 and carried to the pickup probes 46 and 48. It will be seen that the period between the energization of the heater electrodes 30 and 32 will be equal to the transit time for the parcels of heated water to travel from the heater 28 to the pickup pulses 46 and 48. In one operative embodiment, the space between the heater 28 and the pickup probes 46 and 48 is on the order of 2 centimeters. When the ocean current has a velocity of 0.01 knot, the transit time for a parcel will be on the order of about 6 seconds. In non-turbulent water, a parcel of 1 millimeter in diameter and 10° C. above the surrounding sea water will spread into a parcel of 3 millimeters in diameter and 1° C. above the surrounding sea water. Thus, the parcel 42 will retain its shape for a sufficient period of time to permit the measuring of even very slow currents. The characteristics of the bridge 60, detector-amplifier 62, pulse shaper 64 and electronic switch 38 may be designed to provide a relatively short response time. For example, the response time may be on the order of 1 microsecond. This will further enhance the ability of the meter 10 to sense the passage of very small well-defined parcels 42 having relatively low temperature differentials. It will also facilitate positioning the pickup probes close enough to the heater 28 to insure the parcels 42 of heated water remaining well defined until they have passed the pickup probes 46 and 48.

As an alternative, the embodiment of the flow meter 70 shown in FIGURE 6 may be employed. This flow meter 70 is very similar to the preceding flow meter 10. It employs a heater 72 having two separate electrically conductive surfaces in intimate contact with the sea water. This electrode may be energized by an electronic switch and power supply substantially identical to that in the first embodiment.

A plurality of pickup probes 74 are provided concentrically around the heater 72. These probes 74 include electrodes 76 and 78 that are alternately connected to buses 80 and 82. The buses 80 and 82 are, in turn, interconnected with means such as the conductivity bridge 60, detector-amplifier 62 and pulse shaper 64 for sensing the conductivity between the probes 46 and 48. It will be seen that this arrangement will eliminate the necessity for mechanically positioning the various components relative to the motion of the current. Instead, the various pickup probes 74 will be arranged such that, irrespective of the direction of flow, the parcels of heated water will always pass between some pair of pickup probes.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A flow meter for measuring the velocity of a current of sea water, said meter including:
   a support constructed to be disposed in said sea water and having first and second ends displaced from each other along a first line, the support being pivotable at the first end to become disposed in the direction of flow of the sea water,
   a heater element mounted on said support at the first end for transferring heat into the sea water,
   means interconnected with said heater element to energize said element for a particular interval of time to form a parcel of heated water adjacent the heater element,
   at least a pair of pickup probes mounted on said support at the second end in symmetrically displaced relationship from the heater element relative to the first line, said probes being electrically interconnected with each other by the electrical conductivity of the sea water therebetween, and
   a bridge circuit electrically interconnected with said probes and responsive to the electrical conductivity between said probes for providing an indication of the passage of the parcel of heated water past the probes.

2. A current flow meter for measuring the rate of flow of sea water, said meter including:
   a support constructed to be disposed in said sea water and having first and second ends displaced from each other along a first line, the support being pivotable at the first end to become aligned with the direction of flow of the sea water,
   a pair of heater electrodes mounted on said support at the first end for disposition in the sea water,
   a power supply interconnected with said heater electrodes to circulate an electrical current between said electrodes and through said sea water to form a parcel of heated sea water that is carried along the first line by said current,
   at least a pair of pickup probes mounted on said support at the second end symmetrically about the first line relative to the heater electrodes, said probes being electrically interconnected with each other by the electrical conductivity of the sea water therebetween to sense the parcel of heated sea water upon the movement of the sea water past the probes,
   bridge means electrically interconnected with said probes and responsive to the electrical conductivity of the sea water between said probes, and
   means interconnected with the power supply and the bridge means and responsive to each sensing of a parcel of heated sea water by the probes to energize said heater electrode for a particular interval to produce a parcel of heated water each time that a parcel of heated sea water is sensed by the pickup probes.

3. A current flow meter for measuring the rate of flow of sea water, said meter including:
   a support constructed to be disposed in said sea water and having first and second ends, the support being pivotable at the first end to become disposed in the direction of flow of the sea water,
   a vane on said support for aligning said support with said direction of flow of sea water,
   at least one heater electrode mounted on said support at said first end for disposition in the sea water to transfer heat into the sea water,
   first means interconnected with said heater electrode to energize said electrode for a particular interval of time to form a parcel of heated water,
   at least a pair of pickup probes mounted on said support at said second end of said support and electrically interconnected with each other by the electrical conductivity of the sea water between the probes to sense changes in the temperature of the sea water between the probes, said vane being effective to maintain said probes aligned with the heater electrode to insure the movement of each parcel between the probes, the probes being symmetrically disposed relative to the heater electrode in the direction of flow of the sea water, and
   means electrically interconnected with said probes and with the first means and responsive to the sensing of changes in the electrical conductivity of the sea water between said probes to energize said heater electrode for the production of a parcel of heated water each time that a parcel travels between the pickup probes and changes the conductivity of the sea water between the probes.

4. A current flow meter for measuring the velocity of a flow of sea water, said meter including:
   a heater constructed to be disposed in the sea water to transfer heat into the sea water immediately adjacent the heater, a frame having first and second ends displaced along a first line, the frame being pivotable at the first end and supporting the heater at the first end, means interconnected with said heater to energize said heater for a particular interval of time to form a a parcel of heated water, at least a pair of pickup probes disposed on said frame at the second end in symmetrically displaced relationship to the first line relative to the heater, said probes being responsive to the electrical conductivity of the sea water between the probes to sense changes in the temperature of the sea water, and means electrically interconnected with said probes and responsive to the electrical conductivity of said probes to produce a signal each time that a parcel of heated water travels past said probes.

5. The combination of claim 4 wherein the last means is effective to periodically energize the heater every time that a parcel of heated water reaches the pickup probes.

6. In combination for measuring the rate of flow of a liquid having an electrical conductivity variable with temperature, heating means constructed to be disposed in said liquid to heat a parcel of said liquid, said parcel having an electrical conductivity that differs from the electrical conductivity of the surrounding liquid as a result of its being heated, said parcel being carried along a particular line of travel by the flow of the liquid, a vane pivotable at a first position and carrying the heating means at the first position, the vane having a second position displaced from the first position, second means disposed on the vane at the second position to become aligned with the first means in the direction of flow of the liquid, said second means being responsive to changes in the electrical conductivity of the liquid to sense the passage of the parcel past the sensing means, and third means interconnected with the heating and second means to energize the heating means every time that a parcel is sensed by the second means.

References Cited

UNITED STATES PATENTS

| 1,611,502 | 12/1926 | Allen | 73—194 |
| 2,274,262 | 2/1942 | Wolff | 73—194 |
| 2,480,646 | 8/1949 | Grabau | 73—194 |
| 2,569,974 | 10/1951 | Campbell | 73—194 |
| 2,603,089 | 7/1952 | Morley et al. | 73—204 |
| 2,637,208 | 5/1953 | Mellen | 73—194 |
| 2,724,271 | 11/1955 | Shawhan et al. | 73—204 |
| 3,148,541 | 9/1964 | Higgins | 73—194 |

OTHER REFERENCES

Hodgman, C. et al.: Handbook of Chemistry and Physics 39th Edition, published by Chemical Rubber Publishing Co., Cleveland, Ohio, 1957, p. 2400.

RICHARD C. QUEISSER, *Primary Examiner.*

EDWARD D. GILHOOLY, *Assistant Examiner.*